United States Patent
Bak

(10) Patent No.: US 7,752,501 B2
(45) Date of Patent: Jul. 6, 2010

(54) DYNAMIC GENERATION AND IMPLEMENTATION OF GLOBALIZATION VERIFICATION TESTING FOR USER INTERFACE CONTROLS

(75) Inventor: Nathan Victor Bak, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 11/460,360

(22) Filed: Jul. 27, 2006

(65) Prior Publication Data

US 2008/0127103 A1 May 29, 2008

(51) Int. Cl.
*G06F 11/00* (2006.01)
(52) U.S. Cl. ............................ 714/38; 704/8
(58) Field of Classification Search .................. 714/4, 714/38, 41; 704/8
See application file for complete search history.

(56) References Cited

U.S. PATENT DOCUMENTS

| | | | |
|---|---|---|---|
| 5,475,843 A * | 12/1995 | Halviatti et al. ............. | 717/124 |
| 6,275,790 B1 | 8/2001 | Yamamoto et al. | |
| 6,425,123 B1 | 7/2002 | Rojas et al. | |
| 6,453,462 B1 | 9/2002 | Meade et al. | |
| 6,507,812 B1 | 1/2003 | Meade et al. | |
| 6,735,759 B1 | 5/2004 | Yamamoto et al. | |
| 6,782,529 B2 | 8/2004 | Kumhyr | |
| 7,389,223 B2 * | 6/2008 | Atkin et al. .................... | 704/8 |
| 2002/0077807 A1 | 6/2002 | Davis et al. | |
| 2002/0162090 A1 * | 10/2002 | Parnell et al. ................ | 717/120 |
| 2004/0122652 A1 | 6/2004 | Andrews et al. | |
| 2005/0065772 A1 * | 3/2005 | Atkin et al. .................... | 704/2 |
| 2005/0137844 A1 * | 6/2005 | Voruganti ....................... | 704/2 |
| 2005/0144530 A1 * | 6/2005 | Louden et al. ................ | 714/38 |
| 2005/0188308 A1 | 8/2005 | Schultz | |

FOREIGN PATENT DOCUMENTS

| | | |
|---|---|---|
| EP | 1071013 | 1/2001 |
| JP | 9330248 | 12/1997 |
| JP | 0011344468 | 5/2001 |

OTHER PUBLICATIONS

PCT, International Search Report PCT/EP2007/056581,Dec. 14, 2007,12 pages, PCT.
Memon A M et al,Empirical evaluation of the fault-detection effectiveness of smoke regression test cases for GUI-based software, Software Maintenance, 2004. Proceeding. 20th IEEE International Conference on Chicago IL USA Sep. 11-14, 2004, Sep. 11, 2004, pp. 8-17.

(Continued)

*Primary Examiner*—Yolanda L Wilson
(74) *Attorney, Agent, or Firm*—Walter W. Duft

(57) ABSTRACT

A machine implemented technique for performing dynamic globalization verification testing in a software user interface includes identifying one or more user interface controls in the software user interface having text strings that have been pseudo translated, generating one or more applicable test cases that test for display defects stemming from the pseudo translations, executing the test cases, and logging defects.

35 Claims, 9 Drawing Sheets

OTHER PUBLICATIONS

Morell L J, Theoretical Insights into fault-based testing, Software Testing, Verification and Analysis, 1988. Proceedings of the second workshop on Banff, Alta, Canada Jul. 19-21, 1988, Washington, D.C., USA, IEEE Comput. Soc. PR. US Jul. 19, 1988, p. 45062.

Bradley N S, The GUI Test Builder-Breaking the Testing Bottleneck, Computer Design, Pennwell Publ. Littleton, Massachusetts, US, vol. 32, No. 9, Sep. 1, 1993, pp. 71-72,74.

IBM Rational Functional Tester, downloaded on May 5, 2006 from <URL:http://www-306.ibm.com/software/awdtools/tester/functional/features>, 4 pages.

M. Kelly, Using IBM Rational Functional Tester 6.1 to run your first functional regression test, Apr. 12, 2005 downloaded on May 2, 2006 from <URL:/www-128.ibm.com/developerworks/rational/library/05/412_kelly/index.html>, 21 pages.

* cited by examiner

DYNAMIC GENERATION AND IMPLEMENTATION OF GLOBALIZATION VERIFICATION TESTING FOR USER INTERFACE CONTROLS

BACKGROUND OF THE INVENTION

1. Field of the Invention

The present invention relates to software globalization verification testing. More particularly, the invention is directed to the automation of globalization verification testing procedures.

2. Description of the Prior Art

By way of background, globalization verification testing, or GVT, is a software internationalization procedure for verifying the integrity of software user interface controls whose text strings require translation from one language to another. For example, a user interface whose controls are initially developed to display English text may need to be translated to non-English languages for persons who do not speak English. The translation process frequently changes a control's text string formatting because the target language will invariably use a different number of words and/or characters to convey the same information. A user interface control that displays the seven-character word "Welcome" in English will thus become "Willkommen" in German and "Bienvenue" in French.

User interface controls whose text strings may require translation include such entities as frames, windows, buttons, tabs, labels, tool bars, menus, text entry forms, dialog boxes, error/status messages, tool tips, group boxes, tables, and other elements. Because such controls and their text strings are rendered using predefined geometry and character map information, the fact that a control may properly display a text string in one language does not mean that the same control will correctly display the text string after it has been translated to another language. Thus, text string translation can and often will result in formatting problems such as text corruption, concatenation, normalization, truncation, etc.

In the past, text string translation required that each user interface control in a software program under test be exposed, inspected for defects and verified for each translated language. This is a laborious and time-consuming task. GVT was developed to streamline the translation verification process. As part of GVT, instead of testing user interface controls after full translation to another language, a procedure known as mock or pseudo translation is performed. The pseudo translations are checked and verified to identify formatting problems that are likely to surface when the actual text string translations are subsequently performed. Only after pseudo translation testing is completed and all problems are resolved will the text strings be fully translated into different languages.

Pseudo translation preserves the readability of the original text string but adds additional formatting according to the anticipated size of the text string following translation to another language. According to one known technique, the original text is appended (or prepended) with additional placeholder characters, such as tildes, and the entire string is bracketed to signify that it has been pseudo translated. The text string "Enter" appearing on a button-style user interface control may thus be pseudo translated to "[Enter~~~~~~~~~~~~~~~]" if it is anticipated that "Enter," a five character word in English, will be translated into another language that requires twenty characters. Another method of pseudo translation involves changing single-byte character codes to double-byte character codes, which are used to represent characters in many non-Western languages.

An advantage of a pseudo translation is that a person who speaks the same language used by the text string author, e.g., English, can perform GVT without having to learn another language. The GVT function may thus be performed relatively early in the development cycle by the software developer, or a co-worker of the developer, instead of shipping the product to another site (possibly in a foreign country) for verification after actual translation. This allows formatting errors detected by GVT to be corrected more quickly and at less cost.

Although GVT is an improvement over previous translation verification techniques based on actual translations, it is still a time consuming, repetitive task. Among other things, GVT requires the manual creation of test cases to check for different kinds of formatting errors according to the user interface control types being evaluated. For example, some user interface control types may need to be checked for text normalization, concatenation and corruption, while other control types need to be checked for each of these errors plus truncation. Creating a set of test cases for each user interface control of a software program requires a tester or engineer who is familiar with both GVT testing and the product that has been translated. This process takes considerable time and most of the effort involves tedious "cut-and-paste" operations insofar as similar tests are usually run on dozens if not hundreds of user interface controls.

Once a set of GVT test cases has been defined, the test cases must be implemented. Again, this is a manual process in which a human tester exposes and inspects each user interface control individually according to the subset of test cases defined for that control. The process is time consuming and subject to human error. GVT additionally requires that all defects detected while running test cases be documented. Documenting a defect requires that the defect be verified by reproducing it. The defect must then be logged (e.g., in defect tracking software) along with verification information such as the steps required to reproduce the defect and a screenshot showing the defect. Defect documentation may also involve information that helps the software developer fix the problem.

It is to improvements in the field of software GVT that the present invention is directed. What is particularly needed is an improved GVT technique that eliminates the time, expense and error associated with manually generating, executing and documenting GVT test cases on multiple user interface controls, and which introduces a greater degree of automation into the GVT process.

SUMMARY OF THE INVENTION

The foregoing problems are solved and an advance in the art is obtained by a novel method, system, computer program product and automated service for performing dynamic globalization verification testing of a software user interface. According to the inventive technique, which is machine implemented, one or more user interface controls in the software user interface having text strings that have been pseudo translated are identified. One or more applicable test cases are generated that test for display defects stemming from the pseudo translations. The test cases are executed. Defects discovered by executing the test cases are logged.

According to exemplary embodiments disclosed herein, an identification of the user interface controls may be initiated by a software program that implements the software user interface. Alternatively, the identification may be obtained by querying the software program. During identification, the user interface controls may be exposed as necessary in order to generate user interface control screen shots. The test cases may be generated by categorizing the user interface controls by type and applying rules that associate the test cases to the user interface control types. At least some of the test cases may be executed by comparing pseudo translated strings in the user interface controls to defined string specifications. The test cases may be executed recursively on child user interface controls associated with parent user interface controls. Logging may include linking screenshots of user interface controls associated with defects and identifying test cases whose execution resulted in discovery of the defects. A report may be generated based on the logging.

According to a further exemplary embodiment disclosed herein, dynamic globalization verification testing of a software user interface may be implemented by a test engine operating in conjunction with an automated functional testing program. The automated testing program is adapted to read a test script identifying one or more user interface controls in the user interface having text strings that have been pseudo translated. The automated testing program queries a software program that implements the user interface to obtain information that allows it to create test objects corresponding to the user interface controls. The automated testing program passes the test objects to the test engine for testing. The test engine utilizes the test objects to generate one or more applicable test cases that test for display defects stemming from the pseudo translations. The test engine executes the test cases and returns control to the automated testing program. The automated testing program logs defects discovered by executing the test cases and generates a test report.

According to a still further exemplary embodiment disclosed herein, dynamic globalization verification testing of a software user interface may be provided by an automated system that directly interacts with a software program that implements the user interface. The automated system is called by the software program and is provided with an identification of one or more user interface controls in the user interface having text strings that have been pseudo translated. The automated system may be called by the software program in response to manipulation of one of the user interface controls. The automated system generates one or more applicable test cases that test for display defects stemming from the pseudo translations, then executes the test cases. The automated system logs defects discovered by executing the test cases and generates a test report. The automated system then returns control to the software program.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1:
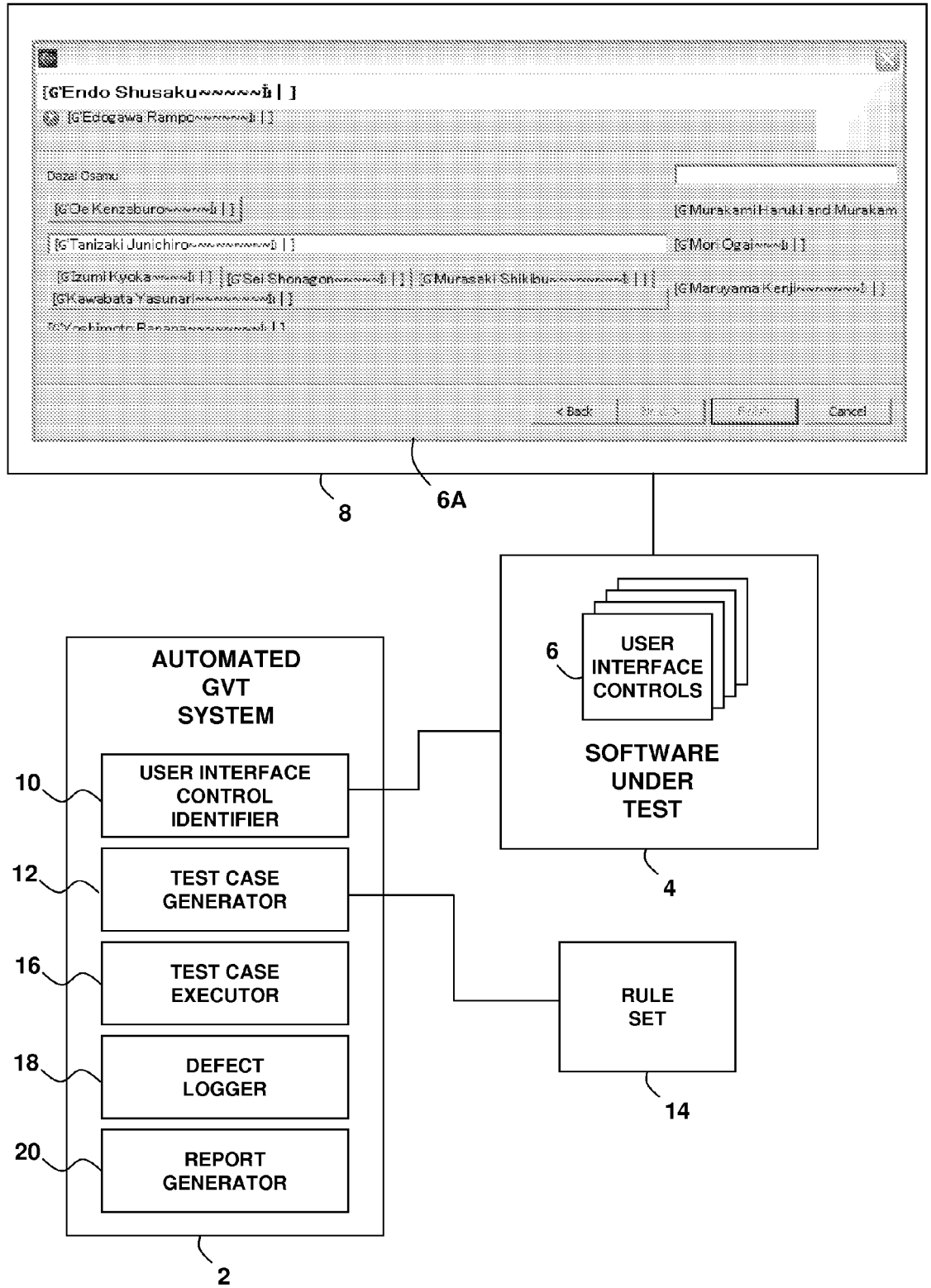
FIG. 1 is a functional block diagram showing an automated globalization verification testing system in accordance with the invention interacting with a software program under test having a user interface.

Turning now to the Drawing figures wherein like reference numerals indicate like components in all of the several views, FIG. 1 illustrates an exemplary system 2 adapted to perform dynamic globalization verification testing in accordance with the invention. Also shown in FIG. 1 is a software program under test 4 that defines various user interface controls 6 for display in a user interface 8 in order to control software program operations. One such user interface control 6A is shown in the user interface 8. The user interface control 6A is a panel-type control that contains a number of child controls such as text boxes, buttons and tabs. As will be described in more detail below in connection with FIGS. 3-9, the user interface control 6A and its children have associated text strings that have been pseudo translated by introducing formatting information and double-byte characters.

The software under test 4 may be any software that displays user interface control components, and may be written using any conventional software language. Examples include but are not limited to Java® (registered trademark of Sun Microsystems, Inc.) byte code that defines the user interface controls 6 as Java® objects, Microsoft® (registered trademark of Microsoft Corporation) Visual Studio .NET code that defines the user interface controls as .NET objects, and web device code that defines the user interface controls using HTML (Hypertext Transport Markup Language) specifications.

The dynamic testing system 2 utilizes functional components 10, 12, 14, 16, 18 and 20 for performing globalization verification testing of the user interface 8. Details of the operations performed by each component will be found in the discussion below of FIG. 2. Exemplary alternative implementations of these components are described below with reference to FIGS. 11 and 12. By way of introduction, the components 10, 12, 14, 16, 18 and 20 may be summarized as follows:

1) Component 10 is a user interface control identifier that identifies, or receives an identification of, user interface controls 6 that have been pseudo translated;
2) Component 12 is a test case generator that categorizes the identified user interface controls 6 by type and generates corresponding globalization verification tests that test for display defects stemming from pseudo translation;
3) Component 14 is a rule set used by the test case generator 12 to associate one or more applicable test cases to each user interface control type;
4) Component 16 is a test case executor 16 that executes each test generated by the test case generator 12;
5) Component 18 is a defect logger that creates log entries of user interface controls 6 that are defective; and Component 20 is a report generator that creates a report following the completion of testing.

As described in more detail below in connection with FIGS. 11 and 12, the foregoing components of the dynamic testing system 2 may be implemented using any suitable machine-implemented logic, including software written in any suitable programming language. The logic may be built upon existing automated functional testing software that is capable of interacting with the software under test 4, or it may be implemented to operate directly with the software under test 4, for example, as a callable routine that is invoked by the software under test during manipulation of the user interface controls 6.

Figure 2:
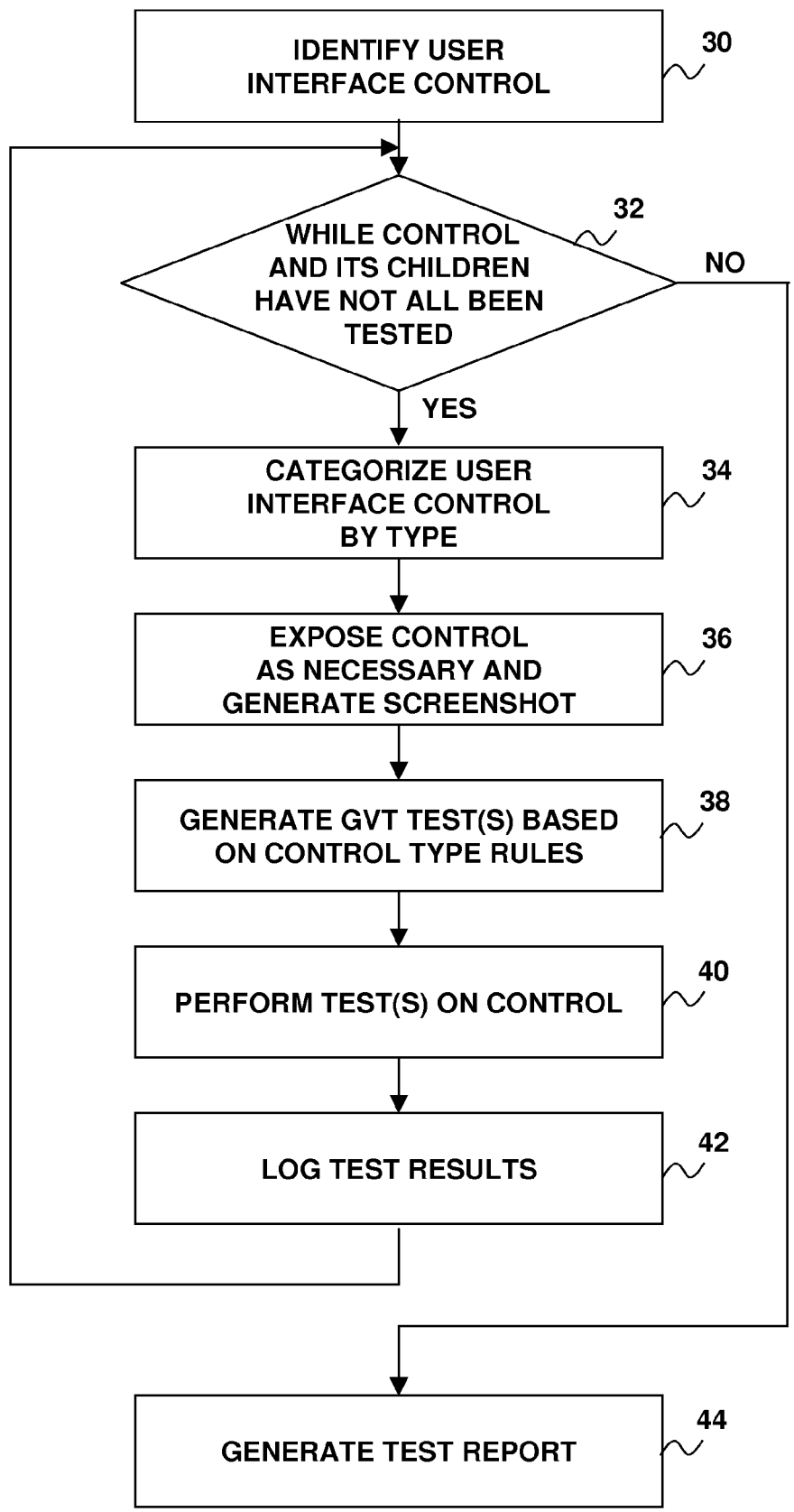
FIG. 2 is flow diagram showing exemplary processing performed by the testing system of FIG. 1.

With additional reference now to FIG. 2, globalization verification testing as performed by the dynamic testing system 2 of FIG. 1 begins with step 30 in which the user interface control identifier 10 identifies at least one of the user interface controls 6 of the software under test 4 that has been pseudo translated. For convenience, the first user interface control 6 that is identified may be a high level container object, such as the frame 6A of FIG. 1, or any other control that serves as a container for other controls, such as buttons, labels and menus. In the ensuing discussion, it is assumed that the user interface control 6A is the initial control being tested by the automated system 4. Step 30 will then further include identifying all children of the parent control 6A for recursive testing of such controls. The identifications of the parent user interface control 6A and its children obtained in step 30 may be stored for subsequent testing using any suitable storage technique, such as creating an array (not shown) containing identifications of the parent control and all child controls to be tested.

As described in more detail below in connection with FIGS. 11 and 12, there are several techniques that may be used to pass an identification of the user interface controls 6 from the software under test 4 to the dynamic testing system 2. These techniques include the user interface control identifier 10 querying the software under test 4 for user interface control information, with the query format being dependent on the manner in which the software under test defines its user interface objects (see discussion of FIG. 11 below). An advantage of this approach is that the software under test 4 does need to be modified in order to exchange information with the dynamic testing system 2. An alternative approach is to modify the software under test 4 by adding software hooks that pass user interface control objects to the dynamic testing system 10 in response to user interface events (see discussion of FIG. 12 below). Opening or closing the user interface control 6A (e.g., using a mouse input device) are examples of such events.

Step 32 of FIG. 2 represents recursive logic that allows the dynamic testing system 2 to recursively test user interface controls that are children of the parent control 6A, and thereby ensure that testing of the user interface 8 is comprehensive and complete.

In step 34, the test case generator 12 categorizes the current user interface control according to its type (e.g., textbox, label, etc.). For standard user interface controls, this information can be determined from the user interface control identification obtained in step 30 insofar as the software under test 4 will normally define its user interface controls by type. For example, if the software under test 4 is a Java® program, the user interface controls 6 may be defined using Java® Java Foundation classes (e.g., the JButton( ) class for button controls). In other cases, the user interface control 6 may be a user-created custom class. In that event, the class type can be categorized based on class parents or the available methods provided by the custom class.

In step 36, the test case generator 12 exposes the current user interface control according to its type and generates a screen shot thereof. Exposing a user interface control may include actions such as switching to an appropriate tab page, expanding a menu, scrolling a panel, or in the case of a combination or list control, selecting the longest choice. The test case generator 12 can expose the current user interface control by issuing conventional input device control commands that cause an input device (e.g., mouse, keyboard, etc.) to perform the necessary input operations within the user interface 8. Alternatively, the test case generator 12 may issue input device simulation commands (e.g., simulated mouse clicks, keyboard presses, etc.) to an API (Application Programming Interface) of the software under test 4, if such is provided. A screen shot of the exposed user interface control may be taken by issuing a screen shot command to lower level software, such as a Java® Virtual Machine or other application, an operating system, or a combination of application and operating system support functions. To aid in test result analysis, the user interface control can be marked, as by modifying the screen shot to draw a box around the control. Alternatively, the user interface control could be marked as by changing its background color. However, this requires modification of the software under test 4 and needs to be performed prior to taking the screen shot.

In step 38, the test case generator 12 generates one or more test cases based on the determined user interface control type. The test cases are designed to test for display defects stemming from pseudo translation. Test case generation may be handled by consulting the rule set 14, which contains rules that associate different user interface control types with one or more test cases. For example, if the user interface control contains permanently displayed text, the test(s) run on the control may be different than if the control contains a tool tip that is temporarily exposed in response to a "mouse-over" event, and so on. It will be appreciated that innumerable associations may be created between user interface control types and GVT test sets, depending on design requirements. As such, no attempt is made herein to catalog any particular rule set associations. Suffice it to state that the rule set 14 will normally be created by an experienced quality assurance engineer, either manually or perhaps partially by way of automatic generation from pseudo translation rules used to translate the user interface control text strings. Insofar as it may be desirable to modify the rule set 14 from the time to time, it can be maintained separately from the dynamic testing system 2 (e.g., in a text file), as illustrated in FIG. 1. Alternatively, the rule set 14 could be coded into the dynamic testing system 2 itself.

In step 40, the test case executor performs each GVT test determined from step 38 on the current user interface control in order to detect display defects stemming from pseudo translation. Without limitation, the following enumerated tests 1-10 are examples of the kind of testing that may be performed according to the type of user interface control being evaluated:

Test 1—Verify that control text is pseudo translated. This can be done by comparing control text to a regular expression such as "\[[GS]'.+~*Ii|]|\A\Z" that searches for elements like brackets ("[" and "]"), tildes ("~") and other pseudo translation formatting elements.

Test 2—Verify that control text is not corrupted. This can be done by comparing control text to a regular expression such as ".\*\?.\*\?.*|\\u[0-9a-fA-F]{4}". This expression looks for frequent use of the ASCII character 3F ("?"), which is often substituted for unrecognized characters. The expression also looks for hexadecimal numbers following a format such as "\uxxxx" where each "x" represents a hexadecimal digit (0-F) and "\uxxxx" should have been converted to an appropriate single character.

Test 3—Verify that pseudo translated control text is not concatenated. This can be done by verifying that all text is contained within the pseudo translated string bookends. Assuming the bookends to be square brackets ("[" and "]"), cases (a) and (b) below would be acceptable, but (c), (d) and (e) would fail:
 (a) [this is some text];
 (b) [error: [file not found error]];
 (c) [this would] [not work];
 (d) this [is some text];
 (e) [this is some] text.

Test 4—Verify that control text is not normalized. When a pseudo translation algorithm uses a commonly normalized character like the Turkish capital dotted I ("İ"), this test verifies that the character is indeed in the string instead of being replaced by a non-dotted capital I ("I").

Test 5—Verify that control text is supported by the control font. This can be done by identifying the font from the control and then checking each character within the control text to verify that there is a direct map to a glyph within the font.

Test 6—Verify that control text displays fully. This can be done by calculating the height and width of the string and verifying that they are less than or equal to the available space of the control (the size of the control minus any boundaries for the control type). For some controls (particularly controls with static sizes), failed tests can return very detailed information such as exactly how many pixels a control needs to be expanded in which direction.

Test 7—Verify that dates/times/numbers are formatted correctly. This can be one using one of two alternatives. If a pseudo locale is being used, the control text can be compared to a regular expression such as "\A<<.+>>\Z" that looks for numeric information separated by periods ".". If not, such formatting can be tested, albeit less accurately, by verifying that the control text matches one or more possible formats for the current locale.

Test 8—Verify that the entire control fits within a parent control. One way of doing this is to make sure that the width of the control plus the X position for the control does not exceed the width of the parent control (and likewise for the height and Y values).

Test 9—Verify that the entire control is displayed. This can be the same as or different than items 6 and 8 above depending on the control type and programming language. This test can be separately implemented by changing the color of the control, capturing an image of where the control should be, and verifying that the entire area contains or is set to that color.

Test 10—Verify that IME (Input Method Editor) settings are correct. For most controls, the IME should always be enabled, but the IME may be disabled for password fields and certain navigation controls.

If any test applied to the current user interface control detects a defect, that defect will be logged in step 42 by the defect logger 18. The log entry may include a link to the screen shot taken in step 36, test case information, and information specific to any failures. If desired, log entries may also be created for tests that complete successfully, such that the log will have pass/fail entries.

Following step 42 and the completion of testing of the current user interface control (e.g., the panel control 6A), processing may return to step 32 in order to recursively test all children of that control. Steps 34-42 will be repeated for each such control. After all child user interface controls have been tested, a test report is generated in step 44 by the report generator 20. The test report may be used for correcting the defects found in the tested user interface control(s) and also for future testing of other user interface controls. One example of the latter would be to use the test report to identify "false positives," so that user interface control types improperly identified as containing defects could either be omitted from future tests or their test results could be ignored. The test report also provides the ability to export the generated test cases for importation into other software testing tools, such as a manual GVT tool.

Figure 3:
FIG. 3 is a screen shot showing exemplary user interface controls displayed by the user interface of FIG. 1, with a control thereof being highlighted for logging.

Turning now to FIGS. 3-9, processing of the user interface control 6A and its child controls will be described in order to illustrate how the dynamic testing system 2 is able to search for and detect various translation defects therein. FIG. 3 shows a screen shot of the user interface control 6A taken in step 36. A box has been drawn around the control 6A (which represents the entire window panel shown in the figure) to identify it to persons who may subsequently consult the test report generated in step 44. The user interface control 6A represents a generic panel control containing text representing English language spellings of Japanese names. This panel and all of its child controls have undergone a pseudo translation process in order to determine whether the control text can be translated into Japanese language characters without error. The pseudo translation scheme converts each English character from single-byte format to double-byte format. Moreover, the English language text is prepended with the characters "G" and "'", and appended with a series of tildes "~" followed by the Turkish capital "İ", the Turkish lower case "i", and a vertical bar "|". Brackets are also placed around each text string. It will thus be seen that the bold-faced, upper left hand text string, which initially read "Endo Shusaku," has been pseudo translated to "[G' Endo Shusaku~~~~~İi|]." The other text strings of the user interface control 6A have undergone similar pseudo translations.

Figure 4:
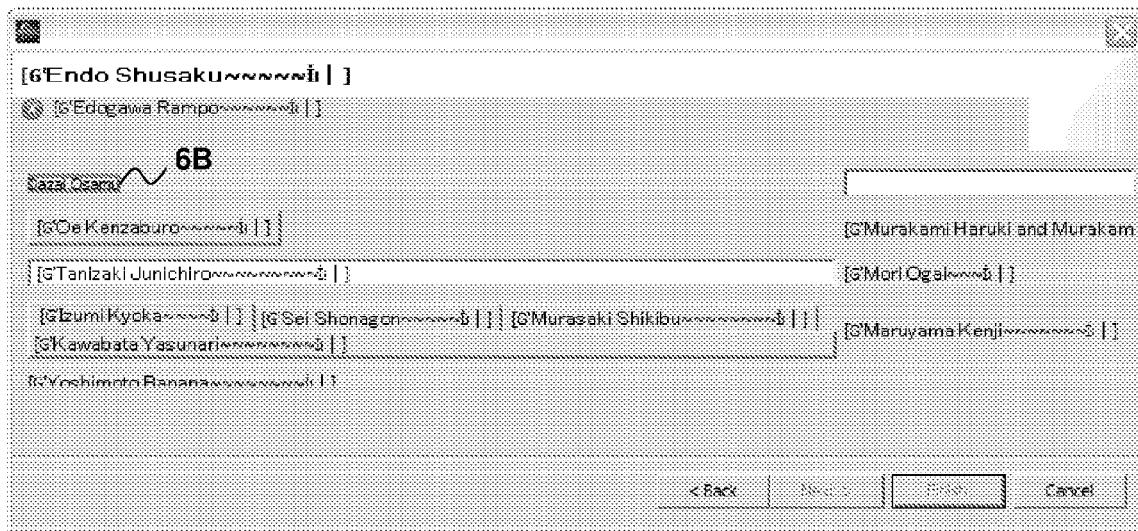
FIG. 4 is a screen shot showing exemplary user interface controls displayed by the user interface of FIG. 1, with another control thereof being highlighted for logging.

FIG. 4 is another screen shot of the user interface control 6A in which one of its children, user interface control 6B, has been highlighted for logging purposes. Step 40 in FIG. 2 will detect that there is a pseudo translation defect (under Test 1 above) insofar as there is a complete lack of any pseudo translation formatting in the label "Dazai Osamu." The defect will be logged in step 42.

Figure 5:
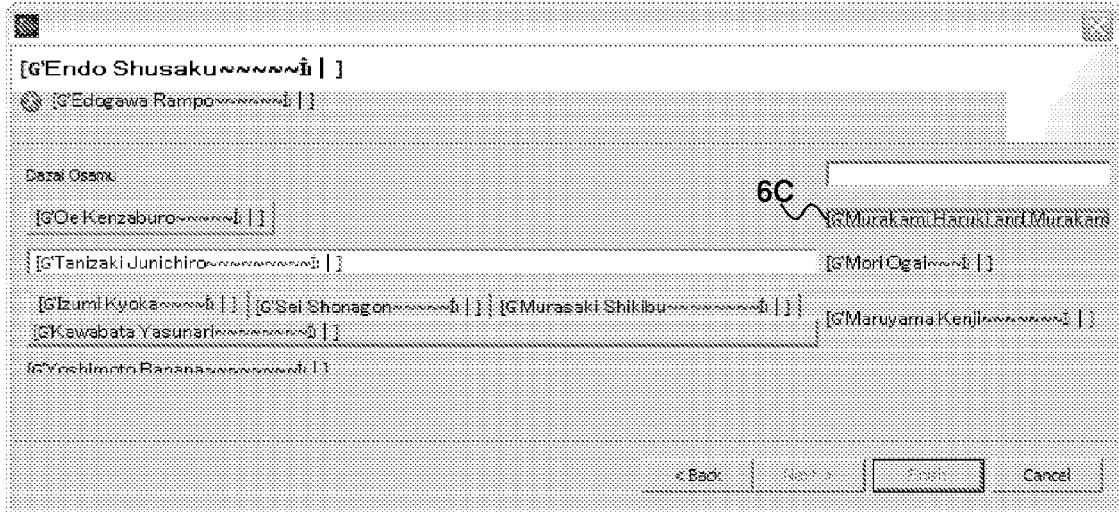
FIG. 5 is a screen shot showing exemplary user interface controls displayed by the user interface of FIG. 1, with another control thereof being highlighted for logging.

FIG. 5 is another screen shot of the user interface control 6A in which one of its children, user interface control 6C, has been highlighted for logging purposes. Step 40 in FIG. 2 will detect that there is a pseudo translation defect (under Test 1 and possibly Tests 6, 8 and/or 9 above) insofar as the right side of the pseudo translated text string "[G' Murakami Haruki and Muakami Ryu~~~~~~~~~~~Ïi|]" has been truncated to "[G' Murakami Haruki and Muakam". The defect will be logged in step 42.

Figure 6:
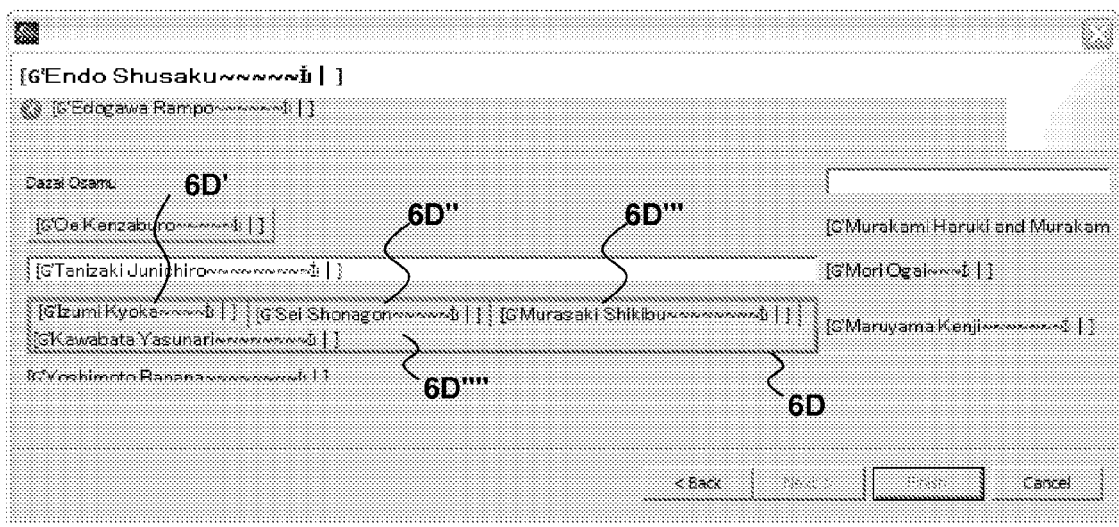
FIG. 6 is a screen shot showing exemplary user interface controls displayed by the user interface of FIG. 1, with another control thereof being highlighted for logging.
Figure 7:
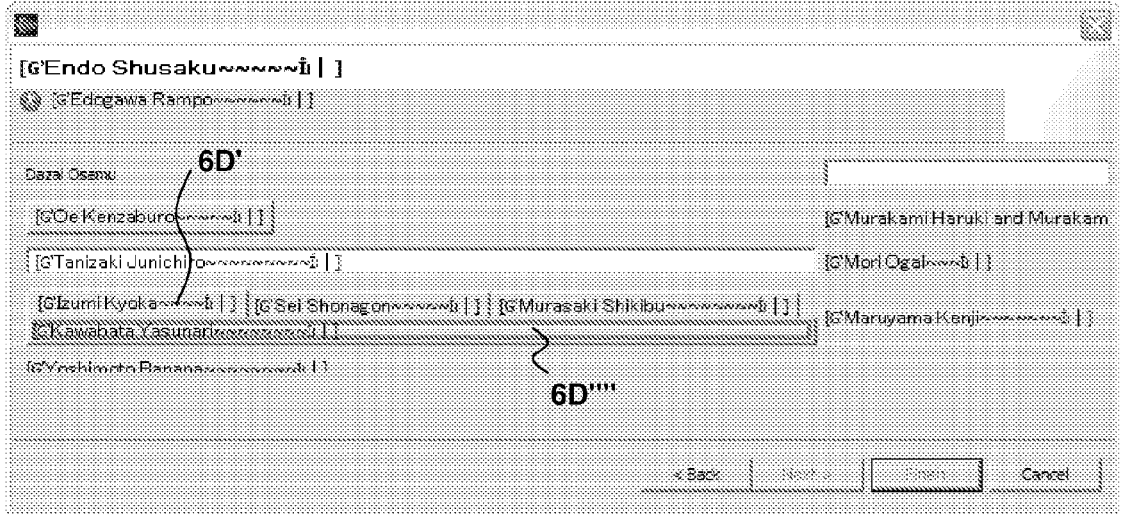
FIG. 7 is a screen shot showing exemplary user interface controls displayed by the user interface of FIG. 1, with another control thereof being highlighted for logging.
Figure 8:
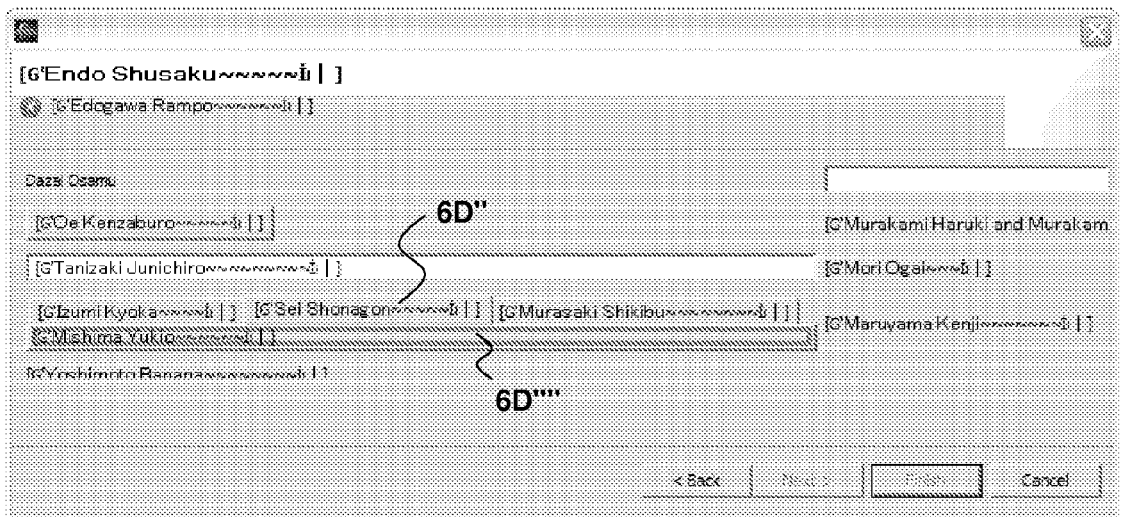
FIG. 8 is a screen shot showing exemplary user interface controls displayed by the user interface of FIG. 1, with another control thereof being highlighted for logging.
Figure 9:
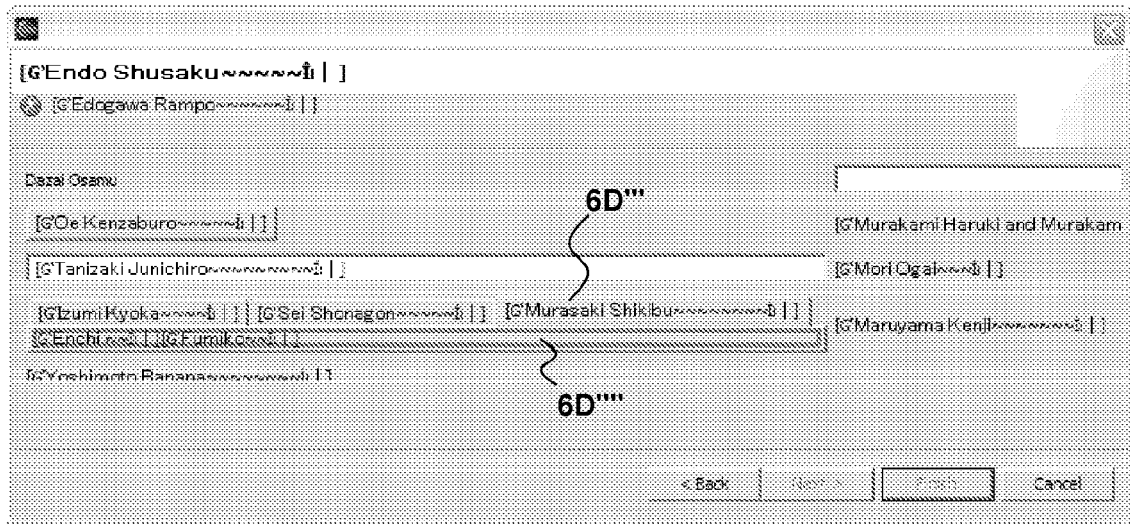
FIG. 9 is a screen shot showing exemplary user interface controls displayed by the user interface of FIG. 1, with another control thereof being highlighted for logging.

FIG. 6 is another screen shot of the user interface control 6A in which one of its children, user interface control 6D, has been highlighted for logging purposes. The user interface control 6D comprises a horizontal array of three tab controls. The left-hand first control tab 6D' is labeled "[G' Izumi Kyoka~~~~|Ïi]." The middle control tab 6D" is labeled "[G' Sei Shonagon~~~~~Ïi|]." The right-hand control tab 6D''' is labeled "[G' Murasaki Shikibu~~~~~~~Ïi|]." A text display panel control 6D'''' is placed below the tabs 6D', 6D" and 6D'''. The text appearing in the control 6D'''' is determined by which of the three tabs 6D', 6D" and 6D''' has been selected. FIGS. 7, 8 and 9 (discussed below) illustrate processing performed during step 36 of FIG. 2 in which each of the tabs 6D', 6D" and 6D'''' is exposed by the dynamic testing system 2 in order to change the text string appearing the panel 6D'''' so that each exposed text string can be tested and logged.

FIG. 7 is a screen shot taken after tab 6D' has been exposed to reveal the pseudo translated text string "[G' Kawabata Yasunari~~~~~~~~Ïi|]" in the panel 6D''''. The panel 6D'''' has been highlighted for logging purposes. There are no translation defects in the translated text string.

FIG. 8 is a screen shot taken after tab 6D" has been exposed to reveal the pseudo translated text string "[G' Mishima Yukio~~~~~~Ïi|]" in the panel 6D''''. The panel 6D'''' has been highlighted for logging purposes. There are no translation defects in the translated text string.

FIG. 9 is a screen shot taken after tab 6D''' has been exposed to reveal two pseudo translated text strings "[G' Enchi~~Ïi|]" and "[G' Fumiko~~Ïi|]" in the panel 6D''''. The panel 6D'''' has been highlighted for logging purposes. Step 40 in FIG. 2 will detect that there is a pseudo translation defect (under Test 3 above), namely a concatenation error, insofar as there should only be one pseudo translated text string that reads "[G' Enchi Fumiko~~Ïi|]." The defect will be logged in step 42.

Figure 10:
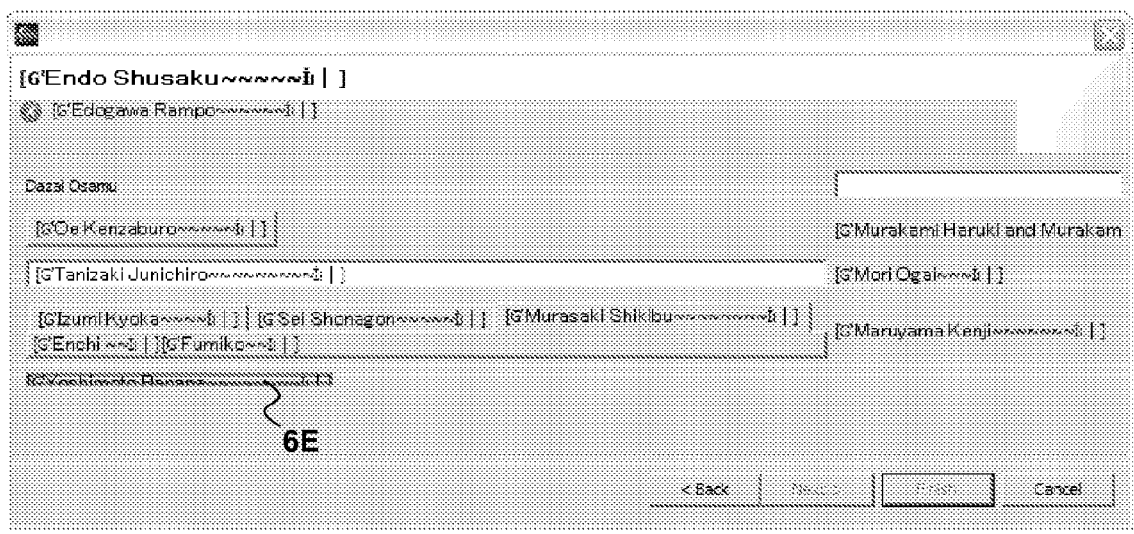
FIG. 10 is a screen shot showing exemplary user interface controls displayed by the user interface of FIG. 1, with another control thereof being highlighted for logging.

FIG. 10 is another screen shot of the user interface control 6A in which one of its children, user interface control 6E, has been highlighted for logging purposes. Step 40 in FIG. 2 will detect that there is a pseudo translation defect (under Tests 6, 8 and/or 9 above) insofar as the bottom portion of the pseudo translated text string "[G' Yoshimoto Banana~~~~~~~~Ïi|]" has been truncated. The defect will be logged in step 42.

Figure 11:
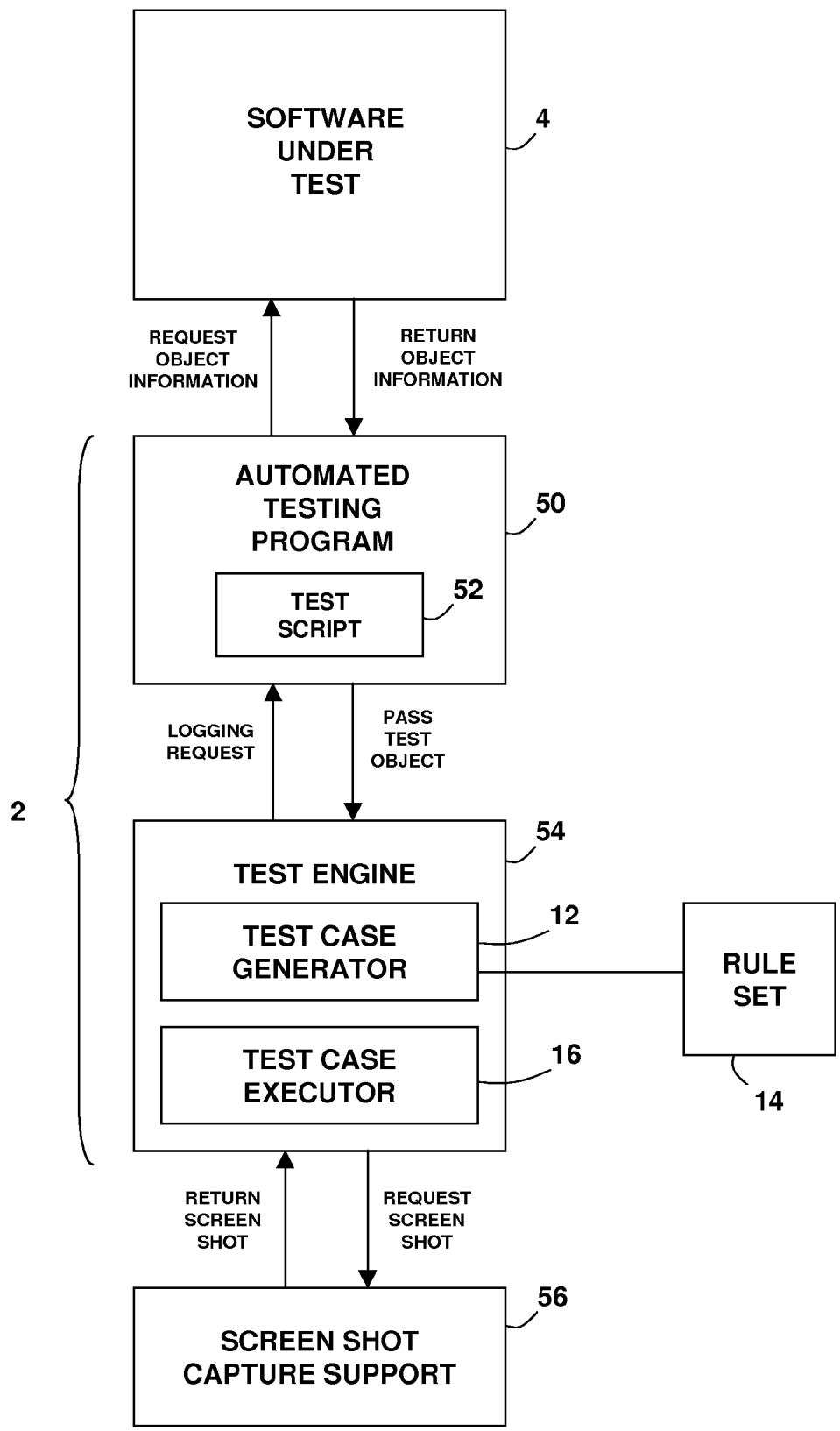
FIG. 11 is a functional block diagram showing an exemplary implementation of the testing system of FIG. 1.

Turning now to FIG. 11, an exemplary implementation of the dynamic testing system 2 is shown in which the system is built by extending an existing automated software functional testing program 50. One exemplary product that may be used to provide the automated testing program 50 is the IBM® Rational® Functional Tester 6.1 (IBM® and Rational® are registered trademarks of International Business Machines Corporation). This product is an automated functional and regression testing tool for testers and user interface developers. The product currently supports Java®, Microsoft® Visual Studio .NET and web-based HTML applications. The product is capable of recording user interactions with user interface controls and creating a test script that, when activated, reproduces those actions in the user interface being tested. Test scripts can also be written manually to perform any desired data manipulation and environment configuration within the target user interface.

One such test script is shown by reference numeral 52 in FIG. 11. It may be written to provide the functions of the user interface control identifier 10 of FIG. 1. In particular, the test script 52 directs the automated testing program 50 to query the software under test 4 via a conventional interprocess communication mechanism. This query requests the software under test 4 to provide object information corresponding to the user interface controls 6. The automated testing program 50 uses the object information to create corresponding test objects that are to undergo dynamic testing in accordance with the invention. Identifications of the user interface controls 6 whose object information is required may be manually written into the test script 52. Alternatively, they could be inserted automatically by recording user selections during interaction with the user interface 8. The functionality required to query the software under test 4, obtain the test object information and generate the test objects is currently available in functional testing products such as the IBM® Rational® Functional Tester 6.1. Also included in this functionality are mechanisms for creating test objects corresponding to child user interface controls of a known parent user interface control. No modifications of the software under test 4 are required.

The test script 52 may be further written to pass test objects from the automated testing program 50 to the test case generator 12 and the test case executor 16, which are collectively shown in FIG. 11 to provide a test engine 54. The test engine 54 may be written as a library routine that is called by the automated testing program 50 when directed to do so by the test script 52. The test engine 54 could also be implemented as an executable program running in a separate process or thread. After being called, the test engine 54 will implement the processing of steps 34, 36, 38, 40 and 42 on the test object passed with the call. The test engine 54 then uses the functions/methods associated with the test object to recursively obtain child test objects that are descendent from the initial test object, repeating steps 34, 36, 38, 40 and 42 for each child object.

Whenever the test case generator 12 needs to expose a user interface control 6, it can request the automated testing program 50 to manipulate the control using conventional input device control commands that cause an input device (e.g., mouse, keyboard, etc.) to perform the necessary input operations on the target user interface control 6 within the user interface 8. Alternatively, the automated testing program 50 could make API calls to the software under test 4 to simulate input device actions. Both types of functionality are currently available in automated testing products such as the IBM® Rational® Functional Tester 6.1.

Whenever the test case generator 12 needs to generate a screen shot of a user interface control 6, it may utilize an existing screen shot capture support service 56 provided by an application (e.g., a Java® Virtual Machine), an operating system, or both. The screen shot capture support service 56 will return a reference to a file containing the captured screen shot. The file can then be modified to add additional graphical artifacts, such as boxes, to help identify the user interface control 6 being captured.

Whenever defect logging is required, the test engine 54 can utilize the existing logging functions of the automated testing program 50. The logging request can be implemented using any suitable technique, such as the test engine 54 registering a logging request callback for processing by the automated testing program 50 after the test engine 54 returns control. The automated testing program 50 may also be used for report generation.

Figure 12:
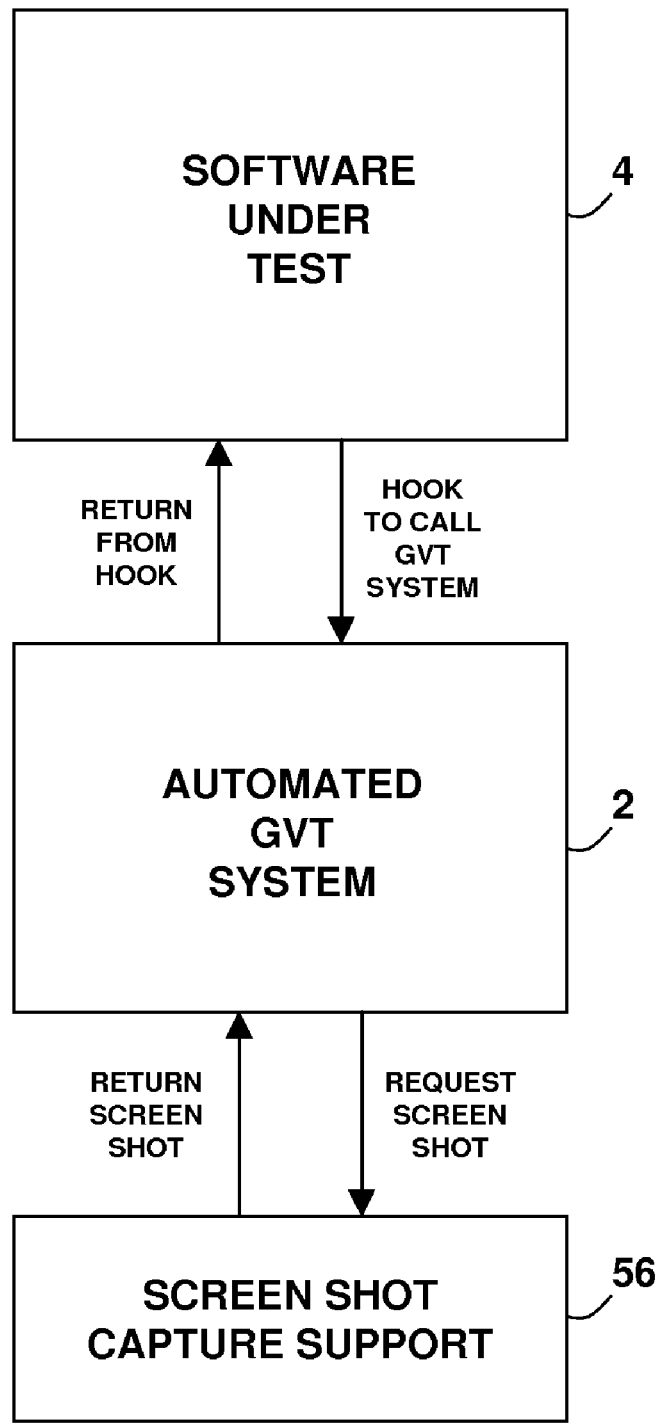
FIG. 12 is a functional block diagram showing another exemplary implementation of the testing system of FIG. 1.

Turning now to FIG. 12, an exemplary implementation of the dynamic testing system 2 is shown in which the system is built as a stand-alone library routine or executable that is called by the software under test 4. This implementation requires modification of the software under test 4, as by providing a hook that calls the dynamic testing system 2 whenever a user interface control 6 is manipulated in a specified way by a user (or via software). Such manipulation could include closing a panel, such as the panel 6A of FIG. 1, opening a panel, or any other action involving the user interface control 6. When called in this fashion, the dynamic testing system 2 will perform the operations described above in connection with FIG. 2, then return control to the software under test 4.

In the implementation of FIG. 12, the dynamic testing system 2 will be responsible for its own logging and test report generation functions. Relative to screen shot generation, the dynamic testing system 2 may invoke an existing screen shot capture support service 56, as describe above relative to FIG. 11.

Figure 13:
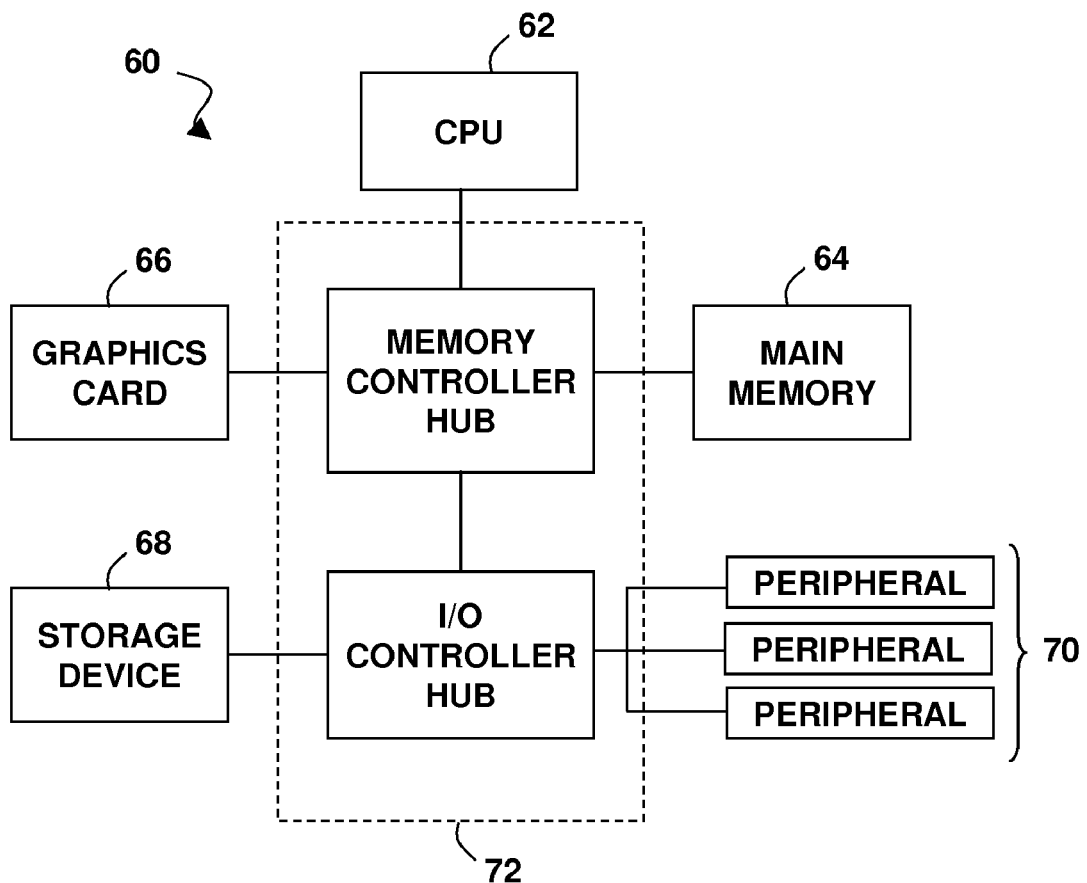
FIG. 13 is a functional block diagram showing an exemplary computer hardware platform that may be used to implement the testing system of FIG. 1.
Figure 14:
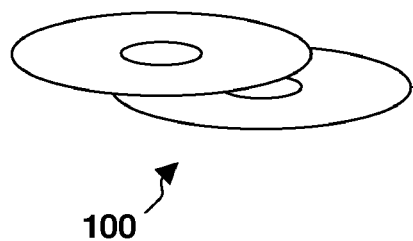
FIG. 14 is a diagrammatic illustration showing physical media that may be used to provide a computer program product for implementing a dynamic instrumentation system in accordance with the invention.

Accordingly, a technique for performing dynamic globalization verification testing in a software user interface has been disclosed. It will be appreciated that the foregoing concepts may be variously embodied in any of a data processing system, a machine implemented method, and a computer program product in which programming instructions are provided by one or more machine-readable media for use in controlling a data processing system to perform the required functions. Relative to a data processing system and machine implemented method, FIG. 13 illustrates an exemplary hardware environment 60 in which the dynamic testing system 2 may be implemented. The hardware environment 60 includes a CPU or other data processing resource 62, a physical memory 64, a graphics card 66 for generating visual output to a monitor (not shown), a peripheral storage device 68, other peripheral devices 70, and a bus infrastructure 72 interconnecting the foregoing elements. The dynamic testing system 2 and the software under test 4 may be loaded in the physical memory 64. The rule set 14 may reside on the storage device 68. The test script 52 may be input through user interaction with the peripheral devices 70 (e.g., keyboard, mouse, etc.). Please amend the paragraph beginning on page 24, line 1, as follows:

Relative to a computer program product having a machine-readable media and programming instructions for controlling a data processing system, exemplary machine-readable media for providing such programming instructions are shown by reference numeral 100 in FIG. 14. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming instructions of the invention, either alone or in conjunction with another software product that incorporates the required functionality. The media providing the programming instructions could also be implemented using portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical semiconductor system or apparatus or device, network, or other entity that can contain, store, communicate or transport the programming instructions for use by or in connection with a data processing system, computer or other instruction execution system, apparatus or device.

It will also be appreciated that the invention may be implemented as an automated globalization verification testing service whereby a software user interface is tested by a service provider following text string pseudo translation by either the service provider or by another entity, such as the software developer who is the service provider's client. According to the service model, all dynamic globalization verification testing functionality would be the same as that shown in FIG. 1 except that the dynamic testing system 2 would be implemented by the service provider at a first location and the software under test would be implemented by the service provider's client at a second location. Communication between the dynamic testing system 2 and the software under test 4 could take place over a network or other telecommunication link using a suitable remote communication protocol. All globalization verification testing could be performed at the service provider location. Following testing, a test report could be generated at the service provider location and sent to the client location.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A machine implemented method for performing dynamic globalization verification testing of a software user interface, comprising:
    identifying one or more user interface controls in said software user interface having text strings that have been pseudo translated;
    generating one or more applicable test cases that test for display defects stemming from said pseudo translations;
    executing said test cases; and
    logging defects discovered by executing said test cases.

2. A method in accordance with claim 1 wherein an identification of said one or more user interface controls is received from a software program that implements said software user interface.

3. A method in accordance with claim 1 wherein an identification of said one or more user interface controls is obtained by querying a software program that implements said software user interface.

4. A method in accordance with claim 1 wherein said one or more user interface controls are exposed as necessary and user interface control screen shots are taken.

5. A method in accordance with claim 4 wherein said one or more applicable test cases are generated from rules that associate said one or more applicable test cases to user interface control types.

6. A method in accordance with claim 1 wherein said one or more applicable test cases are generated by categorizing said one or more user interface controls by type.

7. A method in accordance with claim 1 wherein said one or more test cases include test cases that compare pseudo translated text strings in said one or more user interface controls to defined string specifications.

8. A method in accordance with claim 1 wherein said one or more test cases are executed recursively on child user interface controls associated with parent user interface controls.

9. A method in accordance with claim 1 wherein said logging includes marking and linking screenshots of user interface controls associated with said defects and identifying test cases whose execution resulted in discovery of said defects.

10. A method in accordance with claim 1 further including generating a report based on said logging.

11. An apparatus for performing dynamic globalization verification testing of a software user interface, comprising: one or more machine readable storage media, said one or more machine readable storage media comprising: a user interface control identifier adapted to identify one or more user interface controls in said software user interface having text strings that have been pseudo translated; a test case generator adapted to generate one or more applicable test cases that test for display defects stemming from said pseudo translations; a test case executor adapted to execute said test cases; and a defect logger adapted to log defects discovered by executing said test cases.

12. An apparatus in accordance with claim 11 wherein said user interface control identifier is adapted to receive an identification of said one or more user interface controls from a software program that implements said software interface.

13. An apparatus in accordance with claim 11 wherein said user interface control identifier is adapted to receive an identification of said one or more user interface controls by querying a software program that implements said software user interface.

14. An apparatus in accordance with claim 11 wherein said user interface identifier is adapted to expose one or more user interface controls as necessary and take user interface screen shots.

15. An apparatus in accordance with claim 14 wherein said test case generator is adapted to generate said one or more applicable test cases from rules that associate said one or more applicable test cases to user interface control types.

16. An apparatus in accordance with claim 11 wherein said test case generator is adapted to generate said one or more applicable test cases by categorizing said one or more user interface controls by type.

17. An apparatus in accordance with claim 11 wherein said test case executor is adapted to execute test cases that compare pseudo translated text strings in said one or more user interface controls to defined string specifications.

18. An apparatus in accordance with claim 11 wherein said test case executor is adapted to execute one or more test cases recursively on child user interface controls associated with parent user interface controls.

19. An apparatus in accordance with claim 11 wherein said defect logger is adapted to mark and link screenshots of user interface controls associated with said defects and identify test cases whose execution resulted in discovery of said defects.

20. An apparatus in accordance with claim 11 further including a report generator adapted to generate a report based on said logging.

21. A computer program product for performing dynamic globalization verification testing of a software user interface, comprising:
one or more machine readable storage media;
programming instructions provided by said machine readable storage media for programming a data processing platform to support global verification testing of a software user interface, as by:
identifying one or more user interface controls in said software user interface having text strings that have been pseudo translated;
generating one or more applicable test cases that test for display defects stemming from said pseudo translations;
executing said test cases; and
logging defects discovered by executing said test cases.

22. A computer program product in accordance with claim 21 wherein an identification of said one or more user interface controls is received from a software program that implements said software user interface.

23. A computer program product in accordance with claim 21 wherein an identification of said one or more user interface controls is obtained by querying a software program that implements said software user interface.

24. A computer program product in accordance with claim 21 wherein said one or more user interface controls are exposed as necessary and user interface control screen shots are taken.

25. A computer program product in accordance with claim 24 wherein said one or more applicable test cases are generated from rules that associate said one or more applicable test cases to user interface control types.

26. A computer program product in accordance with claim 21 wherein said one or more applicable test cases are generated by categorizing said one or more user interface controls by type.

27. A computer program product in accordance with claim 21 wherein said one or more test cases include tests that compare pseudo translated text strings in said one or more user interface controls to defined string specifications.

28. A computer program product in accordance with claim 21 wherein said one or more test cases are executed recursively on child user interface controls associated with parent user interface controls.

29. A computer program product in accordance with claim 21 wherein said logging includes marking and linking screenshots of user interface controls associated with said defects and identifying test cases whose execution resulted in discovery of said defects.

30. A computer program product in accordance with claim 21 wherein said programming instructions are further adapted to generate a report based on said logging.

31. A method for performing dynamic globalization verification testing at a first location of a software user interface implemented by a software program at a second location, comprising:
receiving at said first location an identification of one or more user interface controls in said software user interface having text strings that have been pseudo translated;
generating one or more applicable test cases at said first location that test for display defects stemming from said pseudo translations;
executing said test cases at said first location;
logging defects discovered by executing said test cases at said first location; and
generating a test report at said first location based on said logging.

32. A method in accordance with claim 31 wherein said dynamic globalization verification testing is implemented by a dynamic globalization verification testing system at said first location.

33. A method in accordance with claim 32 wherein said dynamic globalization verification testing system comprises an automated functional testing system operating in conjunction with a test engine.

34. A computer program product for performing dynamic globalization verification testing of a software user interface, comprising:
one or more machine readable media;
programming instructions provided by said machine readable storage media for programming a data processing platform to implement an automated functional testing program and a test engine adapted to support dynamic globalization verification testing of a software user interface, as by:

said automated testing program reading a test script identifying one or more user interface controls in said software user interface;

said automated testing program querying a software program implementing said software user interface to obtain information for creating one or more test objects corresponding to said one or more user interface controls having text strings that have been pseudo translated;

said automated testing program passing said one or more test objects to said test engine for testing;

said test engine utilizing said one or more test objects to generate one or more applicable test cases that test for display defects stemming from said pseudo translations;

said test engine executing said test cases;

said test engine returning control to said automated testing program; and said automated testing program logging defects discovered by executing said test cases and generating a test report.

35. A computer program product in accordance with claim 34 wherein said test engine comprises a test case generator adapted to generate said one or more test cases based on a rule set, and a test case executor adapted to execute said one or more test cases.

* * * * *